United States Patent [19]

Alten

[11] Patent Number: 4,551,877
[45] Date of Patent: Nov. 12, 1985

[54] RAMP BRIDGING DEVICE

[76] Inventor: Kurt Alten, Ringstr. 14, 3015 Wennigsen, Fed. Rep. of Germany

[21] Appl. No.: 500,256

[22] Filed: Jun. 2, 1983

[30] Foreign Application Priority Data

Jun. 4, 1982 [DE] Fed. Rep. of Germany ....... 3221133

[51] Int. Cl.⁴ .............................................. E01D 1/00
[52] U.S. Cl. ..................................... 14/71.7; 14/71.3; 14/71.1
[58] Field of Search ...................... 14/69.5, 71.1, 71.3, 14/71.5, 71.7, 72.5

[56] References Cited

U.S. PATENT DOCUMENTS

| 3,175,238 | 3/1965 | Pennington | 14/71.7 |
| 3,179,968 | 4/1965 | Lambert | 14/71.7 |
| 3,235,895 | 2/1966 | Wallace et al. | 14/71.7 |
| 3,388,413 | 6/1968 | Clarke | 14/71.7 |
| 3,475,779 | 11/1969 | Johnson | 14/71.3 |
| 4,224,709 | 9/1980 | Alten | 14/71.3 |

Primary Examiner—James A. Leppink
Assistant Examiner—Beverly E. Hjorth
Attorney, Agent, or Firm—Becker & Becker, Inc.

[57] ABSTRACT

A ramp bridging device having a bridge plate, the rear end of which is pivotably mounted to a ramp about a horizontal transverse shaft, and an extension for rest and support on a platform which is to be loaded or unloaded. The extension is located at the free end of the bridge plate, is movable in the longitudinal direction of the bridge, and can be extended and retracted. Below a continuous cover plate, the bridge plate is provided with longitudinal members which are parallel to one another. The edges of the bridge plate are preferably provided with vertical side plates. Furthermore, the extension is provided with a portion which extends approximately over the width of the bridge and is adapted to rest on the platform. The extension is also provided with longitudinal members which extend parallel to one another. The longitudinal members of the extension extend freely toward the back from the aforementioned portion of the extension, and are held and guided between the cover plate of the bridge plate and a transverse member. The ends of the transverse member are rigidly connected with the lateral edges of the bridge plate.

7 Claims, 3 Drawing Figures

RAMP BRIDGING DEVICE

BACKGROUND OF THE INVENTION

The present invention relates to a ramp bridging device (a transfer bridge or dock leveler), and has a bridge plate, the back end of which is pivotably mounted to the ramp or dock about a horizontal transverse shaft, and an extension which is located on the free end of the bridge plate, can be moved in the longitudinal direction of the bridge, and can be extended and retracted. The extension serves for rest and support on a platform which is to be loaded or unloaded. Below a continuous cover plate, the bridge plate is provided with longitudinal members which are parallel to one another. The edges of the bridge plate are preferably provided with vertical side plates. Furthermore, the extension is provided with a portion which extends approximately over the width of the bridge, and is intended for support on the platform. The extension is also provided with longitudinal members which are parallel to one another.

With the heretofore known ramp bridging devices of this general type, the cover plate of the extension extends far below the bridge plate or the cover plate thereof. In this connection, the cover plate of the extension is slotted; the longitudinal members of the bridge plate extend into these longitudinal slots so that they can also be effective in the front part of the bridge plate. However, this slotted construction has the drawback that the manufacture of the extension is made more difficult; furthermore, special support members must be provided on the longitudinal members of the bridge plate in order to assure the required rigidity for the bridge.

It is an object of the present invention to provide a ramp bridging device which overcomes these drawbacks.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 1:
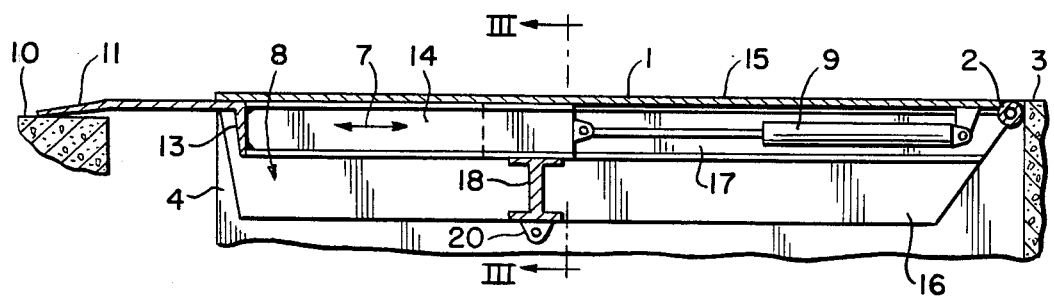
FIG. 1 is a schematic longitudinal cross section through one inventive embodiment of a ramp bridging device which is in operation.

To simplify the bridge construction and to increase the load capacity of the bridge, the device of the present invention is characterized primarily in that the longitudinal members of the extention extend freely toward the rear in the manner of a comb; furthermore, these longitudinal members are arranged and guided between the cover plate of the bridge plate and a transverse member, the ends of which are connected to the lateral cover plates of the bridge plate.

Accordingly, when the ramp bridging device of the present invention is subjected to bending stress, the tops of the longitudinal members of the extension rest against the underside of the cover plate of the bridge plate, and the bottoms of the longitudinal members of the extension rest on the transverse member of the bridge plate. Furthermore, the longitudinal members of the extension are disposed between the longitudinal members which underpin the bridge plate; the tops of these latter longitudinal members are rigidly connected, for example by means of welding, to the cover plate of the bridge plate, while the bottoms of these same transverse members are similarly connected with the transverse member. When the extension is retracted or pulled in, the longitudinal members of the extension, the back ends of which extend out freely, penetrate more and more between the longitudinal members of the bridge plate. In this connection, it should be noted that when the longitudinal members of the extension are extended, they still slightly overlap the longitudinal members of the bridge plate.

Such a bridge construction has a high operating reliability and is resistant to stress. The longitudinal members of the extension, which project toward the rear in the manner of a comb, also underpin that region of the cover plate of the bridge plate which is not supported by the longitudinal members of the bridge plate.

DESCRIPTION OF A PREFERRED EMBODIMENT

Referring now to the drawing in detail, the back end of the bridge plate 1 is pivotably mounted, about a transverse shaft 2, on the dock or ramp 3, which is provided with a recessed portion 4, an edge 5, and a work surface 6. At the forward free end of the bridge plate 1 is located an extension 8 which can be moved back and forth in the direction of the double arrow 7 (the longitudinal direction of the bridge); the extension 8 can be moved by the cylinder 9. The extension 8 serves to support the bridge plate 1 on the bed or platform 10 of a vehicle which is to be loaded or unloaded when the bridge is in operation and a sequential movement of the bridge plate 1 can occur relative to a changing height of the platform 10. For these reasons, the bridge is made slightly front-heavy.

The extension 8, in turn, comprises an angular portion 11 which is supported on the platform 10 and extends uninterrupted from one edge of the bridge to the other edge. The approximately horizontal leg 12 establishes the connection with the platform 10, while the vertical leg 13 serves for the mounting of double-T-shaped longitudinal members 14. The longitudinal members 14 are welded onto the leg 13, and extend in the direction of the double arrow 7, and in particular from the portion 11 in the direction toward the transverse shaft 2. Viewed as a whole, the portion 11 together with the longitudinal members 14 forms a comb-like structure.

The bridge plate 1 has an uninterrupted cover plate 15 which is made of steel or the like and extends to the edge 5 of the ramp. Side plates 16 made of steel or the like extend vertically downwardly from the edge of this cover plate 15. Among other things, one job of these side plates 16 is to conceal the gap between an upwardly pivoted bridge plate 1 and the ramp 3. A large part of the length of the bridge plate 1 is provided with longitudinal members 17 which are parallel to one another and are mounted on the cover plate 15 from below. The backs of the longitudinal members 17 end in the vicinity of the transverse shaft 2 and the front regions of the longitudinal members 17 are underpinned by double-T-shaped transverse members 18, the ends or end faces of which are rigidly welded with side plates 16. The longitudinal members 17 are also welded to the transverse members 18.

Enough longitudinal members 14 of the extension 8 are provided that one of these longitudinal members 14 can be disposed between every two longitudinal members 17, and at the same time the laterally outwardly disposed longitudinal members 14 can form the lateral termination of the movable extension 8; in other words, just like the lateral edges of the portion 11, the laterally outwardly disposed longitudinal members 14 can be guided by the inner surface of the side plates 16. Accordingly, the number of longitudinal members 14 is preferably greater than the number of longitudinal members 17. In the illustrated embodiment, five longitudinal members 14 and four longitudinal members 17 are provided.

Figure 2:
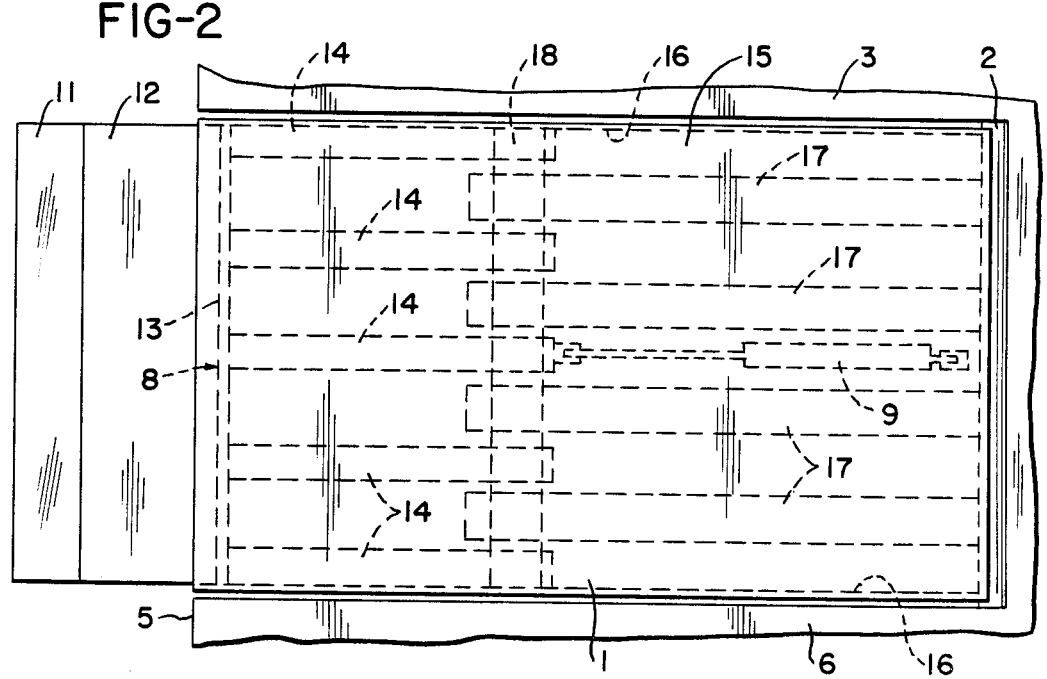
FIG. 2 is a plan view of the bridging device of FIG. 1.
Figure 3:
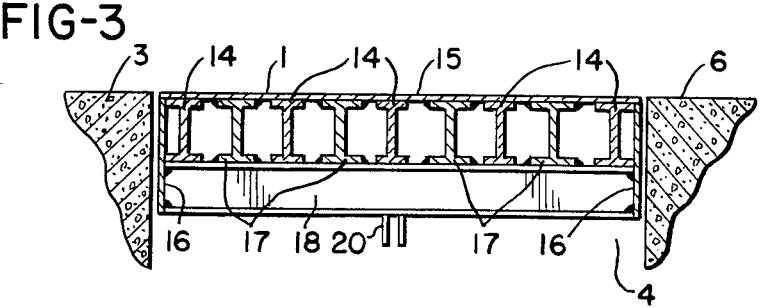
FIG. 3 is a section taken along line III—III in FIG. 1.

As can be seen in FIGS. 1 and 3, the level of the longitudinal members 14 is the same as the level of the longitudinal members 17. The intermediate spaces thus formed between the cover plate 15 and the transverse member 18 therefore allow the longitudinal members 14 to be accommodated with enough play that they can be moved. Since, as clearly shown in FIG. 2, the longitudinal members 14 and 17 overlap in the region of the transverse member 18 when the extension 8 is fully extended, considerable rigidity is also obtained in the front region of the bridge plate 1, which is not underpinned by the welded-on longitudinal members 17. Thus, the longitudinal members 14 are rigidly held and guided between the cover plate 15 and the transverse member 18.

When the extension 8 is retracted, the longitudinal members 14 and 17 overlap even more. The front portion of the bridge plate 1 is then underpinned by the angular portion 11, as a result of which the required rigidity of the bridge structure is also achieved for the bridge when it is not being used; in this state, the top of the bridge is essentially flush with the work surface 6.

It should also be noted that the lifting mechanism 20, which is not shown in detail, and which is provided for raising the bridge, is generally a hydraulic lifting cylinder and preferably acts on the bottom of the transverse member 18.

The present invention is, of course, in no way restricted to the specific disclosure of the specification and drawing, but also encompasses any modifications within the scope of the appended claims.

What I claim is:

1. A ramp bridging device, comprising:
    a bridge plate having a front end and a back end, with said back end being pivotably mounted to a ramp about a horizontal axis; said bridge plate including a continuous cover plate and having longitudinal lateral edges;
    first longitudinal members arranged below said cover plate and disposed parallel to one another;
    an extension associated with said front end of said bridge plate and adapted to rest, during operation, on a platform which is to be loaded or unloaded; said extension being extendable and retractable necessarily by shifting back and forth relative to said bridge plate, with movement of said extension being effected in the longitudinal direction of said device; said extension including a portion which extends substantially over the width of said device, said portion, during operation, effecting said resting of said extension on said plateform;
    a transverse member having two opposite ends which are rigidly associated with said lateral edges of said bridge plate;
    second longitudinal members associated with said extension, said second longitudinal members extending freely from said portion of said extension toward said back end of said bridge plate, and being held and guided between said transverse member and said cover plate of said bridge plate; in an extended state of said extension, said first and second longitudinal members overlap one another above said transverse member, said first and second longitudinal members being steel sections arranged alternately between one another; and
    side plate means laterally arranged rigidly on said bridge plate as bridge termination toward the side thereof, said side plate means including substantially vertical side plates connected securely with said lateral edges of said bridge plate and extending freely rearwardly in the direction of said transverse member; said ends of said transverse member being connected with said side plates which extend freely toward the rear as well as being arranged to extend between said cover plate and said transverse member which is rigidly connected with a bridge lateral edge respectively due to fastening via said side plate means which terminate the bridge toward the side and which also serve as support carriers therewith.

2. A ramp bridging device according to claim 1, in which said first longitudinal members are rigidly connected with said transverse member.

3. A ramp bridging device according to claim 1, in which said first longitudinal members and said second longitudinal members are disposed at the same level when viewed in a horizontal direction.

4. A ramp bridging device according to claim 1, in which said plates have inner surfaces which face one another, and in which said extension has lateral edges which are limited by a respective second longitudinal member, each of which rests against the inner surface of an adjacent side plate to effect guidance of said extension.

5. A ramp bridging device according to claim 4, in which the number of said first longitudinal members is "n", and the number of said second longitudinal members is "n+1".

6. A ramp bridging device according to claim 1, which includes a lifting mechanism for raising and lowering said bridge plate, said lifting mechanism being associated with said transverse member.

7. A ramp bridging device according to claim 1, in which said portion of said extension is an angular portion having a vertical leg, and in which said second longitudinal members are welded to said vertical leg of said angular portion.

* * * * *